United States Patent [19]

Bansal

[11] 4,351,664

[45] Sep. 28, 1982

[54] FURNACE DELIVERY SYSTEM

[75] Inventor: Bihari Bansal, Harrodsburg, Ky.

[73] Assignee: Corning Glass Works, Corning, N.Y.

[21] Appl. No.: 244,024

[22] Filed: Mar. 16, 1981

[51] Int. Cl.$^3$ .............................................. C03B 7/06
[52] U.S. Cl. .................................... 65/128; 65/135; 65/136; 65/327; 65/346; 65/356
[58] Field of Search ................. 65/135, 136, 346, 356, 65/326, 327, 128, 137, 126

[56] References Cited

U.S. PATENT DOCUMENTS

| | | | |
|---|---|---|---|
| 2,282,554 | 5/1942 | Barker, Jr. ........................ | 65/326 X |
| 2,861,596 | 2/1956 | Ipsen . | |
| 2,951,316 | 9/1960 | Slayter ............................. | 65/327 X |
| 2,978,750 | 4/1961 | McMullen ......................... | 65/128 X |
| 2,993,079 | 4/1961 | Augsburger ....................... | 13/6 |
| 3,244,493 | 4/1966 | Cala .................................... | 65/135 X |
| 3,268,321 | 8/1966 | Chapman ........................... | 65/128 |
| 3,524,206 | 4/1968 | Boettner et al. ................... | 13/6 |
| 3,583,861 | 9/1968 | Preston ............................... | 65/135 |
| 3,635,444 | 9/1970 | Potter ................................. | 259/4 |
| 3,725,558 | 5/1971 | t'Serstevens ..................... | 13/6 |
| 3,742,111 | 1/1972 | Pieper ................................. | 13/6 |
| 3,942,968 | 11/1974 | Pieper ................................. | 65/134 |
| 4,029,887 | 4/1976 | Spremulli .......................... | 13/6 |
| 4,143,232 | 11/1976 | Bansal et al. ...................... | 13/6 |

FOREIGN PATENT DOCUMENTS 1412599 12/1972 United Kingdom .

Primary Examiner—Arthur D. Kellogg
Attorney, Agent, or Firm—John P. DeLuca; Burton R. Turner

[57] ABSTRACT

There has been provided a delivery system for conditioning molten thermo-plastic material, wherein a first pipe member, having an inlet at one end adapted to receive the material and an outlet at an opposite end for delivering the material therefrom at a desired homogeneity is coupled at its inlet end to a furnace. An insulated shell structure, having at least one fluid inlet and outlet therein, is located concentrically about the first pipe member and defines a closed insulated space thereabout. The shell is adapted to receive heat exchange fluid for circulation from the inlet to the outlet in said closed space for removing heat from the thermo-plastic material flowing through the pipe member. Means is provided for shielding inside surfaces of space between the shell and the pipe member from deleterious ambient including a purge fluid which may act alone as the heat exchange fluid.

17 Claims, 3 Drawing Figures

FURNACE DELIVERY SYSTEM

BACKGROUND OF THE INVENTION

The present invention relates to a delivery and conditioning system in a furnace for carrying molten thermoplastic material therethrough from the furnace and discharging same at some desired temperature and consistency. The invention more particularly pertains to a glass delivery system wherein the glass is conditioned to a desired relatively uniform temperature and viscosity by means of a heat exchange device for efficiently and economically removing heat from the material in order to achieve the desired result.

Vertically oriented electric glass melting furnaces have been known in the prior art for some time, but it has been only in the last several years that such furnaces have been brought to large scale commercial application. In more recently developed furnaces, such as the type illustrated in U.S. Pat. Nos. 2,993,079, 3,524,206, 3,582,861, 3,725,558, 3,742,111, 3,942,968, 4,029,887 and 4,143,232, glass forming batch materials are fed to the upper end of a vertical chamber and refined molten glass is withdrawn from the bottom of the chamber. High quality glass is thus produced in a single vertical chamber, with melting occurring in an upper portion thereof and preferably some refining occurring at the bottom portion.

The molten glass withdrawn from the electric furnace is usually received within a laterally extending connected channel situated at one side of the furnace bottom and thereafter is usually directed through a vertical passageway or riser to a mixing chamber and/or a forehearth. For example in U.S. Pat. No. 3,942,968 to Pieper, the molten glass is withdrawn laterally from the furnace through a connected channel, thereafter is directed to a riser portion where colored materials may be added, from the riser to a downwardly extending mixing chamber, laterally from the chamber through a second connected channel, then upwardly through a second riser, and finally to a forehearth or feeder. In the Pieper system, the delivery passageway extending from the furnace bottom is formed in refractory block material of the contiguous walls of the furnace and riser, and an electrode is positioned in the passageway. It will be appreciated by those skilled in the art of melting glass that the passageway electrode may not be used when coalesced forming or batch material surrounds the electrode because the cold material will not be electrically conductive.

In some electric glass melting furnaces heretofore employed, a refractory metal delivery conduit extends from near the center of the bottom of the furnace to the confines or passageway of the connected channel. The conduit is either placed on the furnace bottom wall or is laid into a trough incorporated in the furnace bottom wall; and the conduit is protected from exposure to solid or liquid contaminants, which originate in the batch and sink through the molten glass, by a cover or refractory block. The delivery system of such type of prior art furnace is provided with devices for heating the cold glass or raw material initially within the conduit; because, during the startup or beginning stage of operation of the furnace, the heat conducted through the conduit from the molten glass in the furnace and connected channel to the glass or raw materials is not sufficient to melt all the cold batch material initially within the conduit.

In the U.S. Pat. No. 4,029,887 to Spremulli, such an apparatus is disclosed for heating glass or raw materials within a delivery conduit extending from an electric glass melting furnace to a connected channel. The conduit is made of an electrically conductive refractory material such as molybdenum (moly) and is used to conduct current from inside the furnace to its exit end in the channel. Joule effect heating between the exit end of the conduit and the electrode in the connected channel indirectly causes the cold glass or raw materials within the conduit to partially melt, to the extent that the materials within the conduit would begin to flow therefrom. A flange assembly for use with the molybdenum conduit is also disclosed. The delivery conduit connects the furnace with a forehearth channel wherein the glass is conditioned.

It is well known in the art that forehearths require substantial amounts of heat energy in order to condition the glass from the furnace temperature at the inlet to some desired forming temperature at the outlet thereof. Thus the forehearth is a net consumer of energy and the anomalous condition exists wherein heat energy input is required to "cool" the glass to the proper forming temperatures.

It is well known that molybdenum, a preferred glass contact material used herein, has significantly higher wear resistance to moving molten glass than conventional refractory materials. However, it is also well known that moly tends to oxidize at temperatures in excess of 550°–600° C. and thus the moly must be protected from deleterious atmosphere (oxygen) when it is used at or above these elevated temperatures. In Spremulli, '887, although the outlet pipe is preferably manufactured of moly and various devices are provided for protecting the moly from oxidation, energy input to the forehearth is required for conditioning the glass.

In the British Pat. No. 1,412,599 commonly assigned to the assignee herein, a delivery system utilizing stationary mixing devices and a heat exchange vessel, is disclosed. The system does not consider the problem of high heat loss since it is located downstream of the forehearth in a forming operation.

The present invention performs the functions of transportation, cooling, and homogenizing molten glass, wherein the useful life of the delivery system is significantly increased and further the system is a net producer of energy in a portion of a furnace wherein heretofore energy has been utilized to remove energy from the glass.

SUMMARY OF THE INVENTION

There has therefore been provided a delivery system for conducting molten thermoplastic material from a furnace comprising, a pipe member having an inlet adapted to receive the material at one end from the furnace and an outlet for delivering the material at a desired homogeneity at a remote outlet location thereof. An insulated shell structure is located concentrically about the pipe and defines an insulated closed space thereabout for retaining heat therewithin. The shell structure has inlets and outlets for circulation of a heat exchange fluid in at least a portion of the space between the pipe and the shell. The heat exchange fluid removes heat from the thermoplastic material flowing through the pipe member to condition same to the desired homogeneity. Means is included for shielding the inside surfaces of the space between the shell and the pipe from deleterious ambient including a purge fluid which may act also as the heat exchange fluid.

The present invention may thus be provided with a purge gas acting as a heat exchange fluid to directly cool the thermoplastic material flowing through the inner pipe or alternatively may be provided with a purge fluid for protecting the pipe and shell and another fluid for cooling the glass. Each of the aforementioned alternatives are within the scope of the present invention and it is contemplated that the use of one or the other of such alternatives is within the option of operating, for example, a glass melting furnace.

Pipe wall thicknesses are not shown in the above drawings since the illustrations are schematic in nature. In general heavy lines are used to emphasize a pipe or structure wall thickness.

DESCRIPTION OF THE PREFERRED EMBODIMENTS

Figure 1:
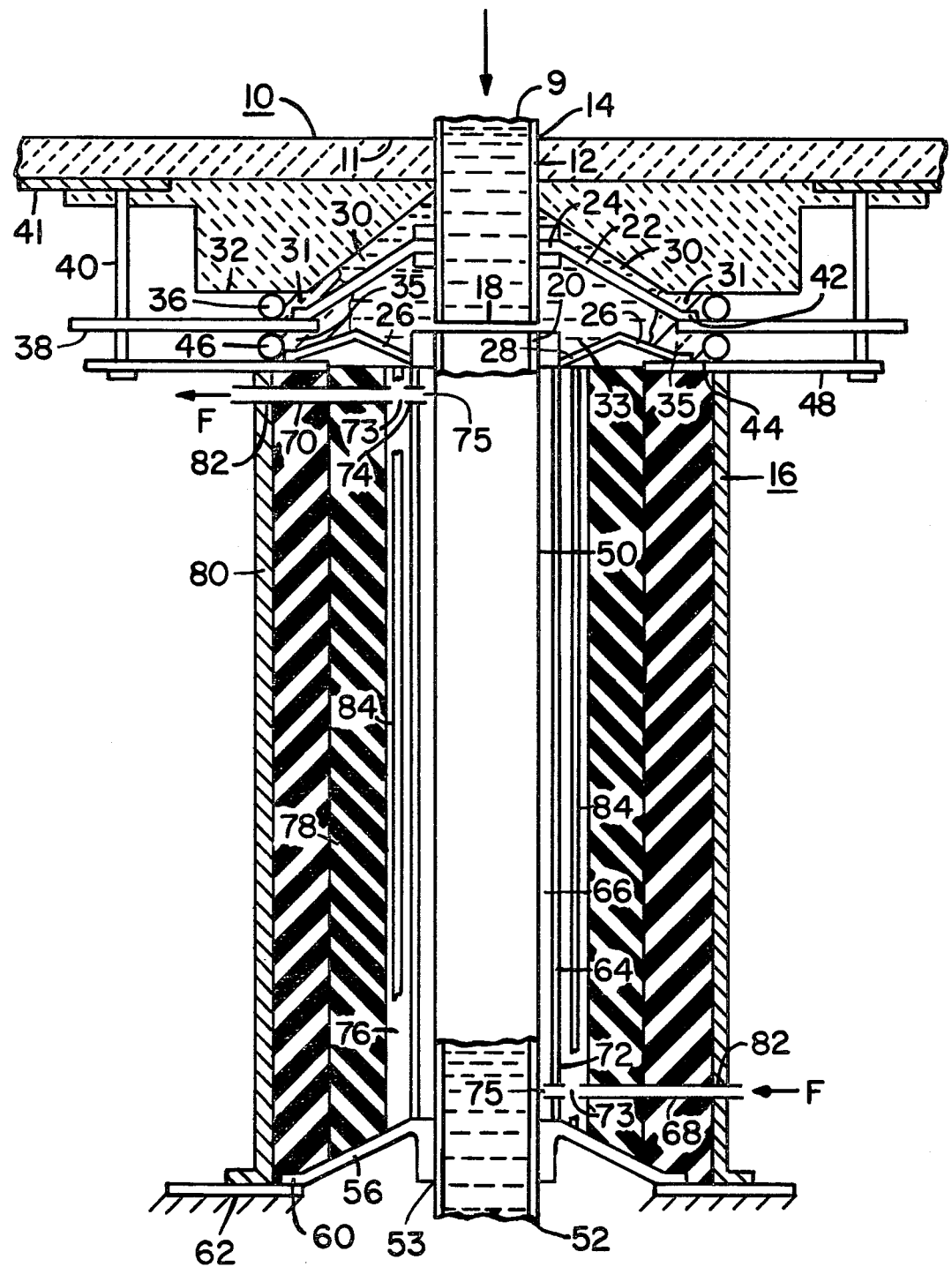
FIG. 1 is a cross sectional elevation of the delivery system of the present invention with a portion of a furnace shown to illustrate the environment.

Referring to FIG. 1, there is illustrated a portion of a vertically oriented electric furnace 10 for melting thermo-plastic material 9, such as glass, having a bottom wall 11 and an outlet or delivery conduit 12 vertically extending through an opening 14 therein. Delivery conduit 12 may extend from above the bottom wall 11 to a position extending below same for mating with delivery system 16 of the present invention. The delivery conduit 12 has a lower end portion or outlet 18 and the delivery system 16 has an upper inlet end 20 closely spaced and in axial alignment therewith. A flange 22 coupled to the delivery conduit 12 at inner radial end 24 supports the delivery conduit 12 in the manner hereinafter described. A flange 26 supports the delivery system 16 at an inboard end 28 also in a manner hereinafter described.

Since it is possible for the glass or thermo-plastic material 9 in the furnace 10 to seep between the opening 14 in furnace bottom wall 11 and the delivery conduit 12, means is provided for freezing the molten thermoplastic material 9 in a space 30 between a refractory block 32 and flange 22. The means includes a cooling pipe 36 welded to a metal support block 38 which in turn is supported by bolts 40 attached to support plate 41 for the bottom wall 11 of the furnace 10. The pipe 36 carries cooling fluid such as water and freezes the glass 9 in a zone 31 contiguous therewith and prevents leakage from the furnace. The flange 22 is supported at an outboard end 42 by the support plate 38 and thus the delivery conduit 12 is held vertically within the furnace bottom 10. Similarly the flange 26 rests at an outboard end 44 on a support plate 48 which is also held by the bolts 40. Fluid pipe 46 is mounted between the support plate 38 and flange 48 to freeze glass 9 seepage from outlet 18 into space 33 between the flanges 22 and 26.

The delivery system 16 of the present invention may generally be described with respect to FIG. 1 as follows. A first pipe 50 preferably fabricated from molybdenum is closely spaced with or may mate at its inlet end 20 with the outlet 18 of delivery conduit 12. The pipe 50 receives the molten thermo-plastic material 9 at the upper end and delivers said material from a lower outlet end 52 thereof. Within the pipe 50 there may be provided mixing means (not shown) for homogenizing the glass 9 as it passes therethrough. For example, one or more stationary mixer elements of the type described in U.S. Pat. Nos. 2,861,596 and 3,635,444 could be conveniently used. In addition to flange 26 at inlet 20, support for the pipe 50 and the delivery system 16 may be provided by a flange member 56 which is welded or otherwise secured to the pipe 50 at inboard end 58 and supported at an outboard radial end 60 by some fixed support 62.

Located about the first pipe 50 is a concentric pipe 64 which may also be fabricated from molybdenum. The pipes 50 and 64 define an annular space 66 therebetween wherein heat exchange or purging fluid may be provided. Inlet and outlet pipes 68 and 70, each having inboard openings 75 in communication with space 66, are secured in respective openings 72 and 74 of the outer pipe 64 and provide for the circulation of fluid F through the space 66. The source of fluid F is not illustrated. The fluid F may be an inert gas with respect to the heated molybdenum pipes 50 and 64 and further may be either a recirculated or single pass fluid. It is recognized that it would not be economical as a general practice to circulate an inert gas in a single pass mode, thus, it is contemplated in the present invention, that if the fluid F is inert and is used as described herein, it would be recirculated. Means would be provided to make up for any leaks in the system.

An insulative structure 78 surrounds the outer pipe 64 and defines yet another space 76 therebetween. Structure 78 may be manufactured and constructed of different layers and grades of insulative refractory materials in order to retain the heat within the delivery system 16. Openings 73 are provided in pipes 68 and 70 so that fluid F may be circulated in the space 76 between outer pipe 64 and structure 78, since the outer surface of pipe 64 must also be protected from oxygen. The system is then rendered more efficient by allowing the fluid F to carry away controlled amounts of heat as determined by its circulation rate.

A shell 80 surrounds the structure 78 and encloses the system. It is mounted between lower support 62 and an upper flange support 48. Openings 82 are provided in shell 80 for the respective inlet and outlet pipes 68 and 70. The entire delivery system 16 is welded or suitably air sealed so that local ambience cannot enter the system to any deleterious extent. Any leaks occurring in the system would be compensated for by overpressure in the circulation of the fluid F.

Heater elements 84, preferably in the form of glow bars are provided in the space 76 between the outer pipe 64 and the structure 78. During startup heater elements 84 may be electrically energized and brought to an elevated temperature to heat pipe 50 and unmelted batch therein. It should be realized that the heater elements 84 might also be utilized to add heat to the delivery system 16 in the event that a certain temperature gradient would be desirable. For the most part however, the heater elements 84 are supplied and incorporated into the delivery system 16 for purposes of startup.

The mixing means (not shown) but referred in the '596 and '444 patents above may be located within pipe 50 to shear, split and homogenize the glass 9. Thus, temperature and physical inhomogeneities (e.g. cords) are progressively removed from the glass 9 moving therethrough.

Figure 3:
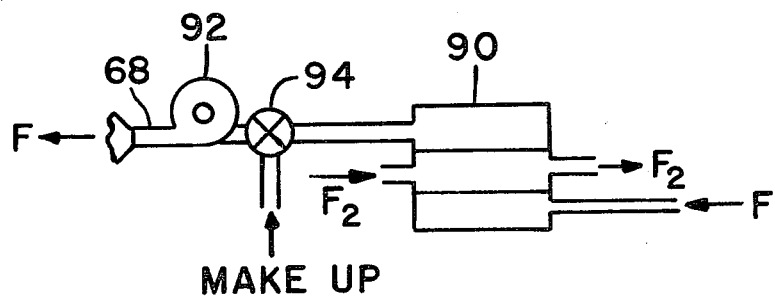
FIG. 3 is a schematic of a circulating system for a heat exchange and a purge fluid.

Sometimes hereinafter, the system described with respect to FIG. 1 may be called a direct heat exchange system. That is, there is a direct heat exchange relation between the thermoplastic material 9 moving through the pipe 50 and the fluid F moving through the spaces 66 and 76. Preferably, the fluid F in the direct heat exchange system is an inert gas and acts not only a heat exchange fluid but a purge gas, thus preventing the infiltration of deleterious oxidizing elements in the atmosphere. The direct system has the advantage that, only one fluid F is required and there is the possibility of enhancing the control of the system by regulating the flow of the fluid F therethrough. The heat carried by the fluid F from the outlet pipe 70 may be coupled to an indirect heat exchange unit 90 as illustrated in FIG. 3. The outlet pipe 70 becomes the inlet for the heat exchanger 90. Pump 92 pressurizes and circulates the fluid F to the inlet 68 of the delivery system 16, and a valve 94 coupled to a source of inert gas (not shown) provides make up gas for the system. A second heat exchange fluid F2 may be provided to cool the heat exchanger 90 and use the heat provided thereby for other useful purposes in the manufacture of glass or as desired by the system user. For example, it has been thought that heated gas may be used to preheat batch materials to thereby increase the efficiency of the glass making process.

Figure 2:
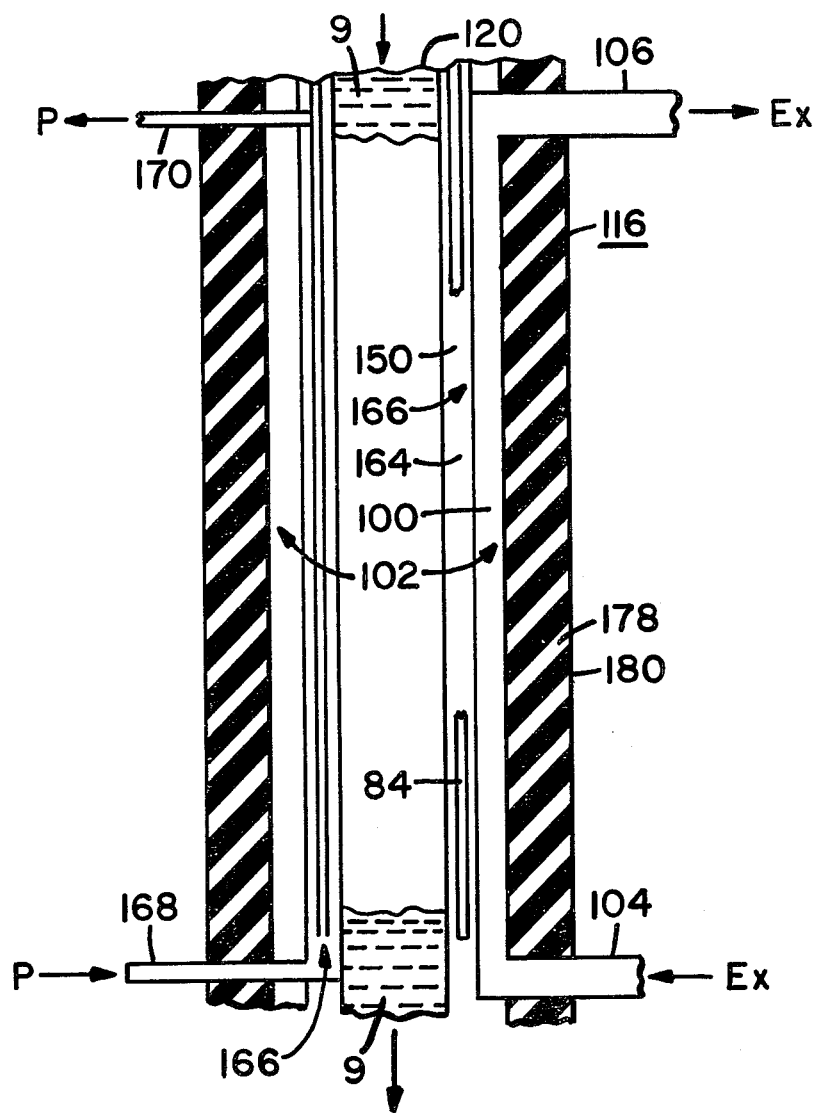
FIG. 2 is a schematic cross section of an alternative embodiment of the present invention.

In FIG. 2 there is illustrated another embodiment of the present invention, sometimes hereinafter referred to as an indirect heat exchange system. A delivery system 116 has an inner pipe 150 which receives molten thermo-plastic material 9 at an inlet end 120 thereof and delivers conditioned material to an outlet end 152 thereof. Stationary mixer elements (not shown), similar to those described with respect to FIG. 1, may be located inside the pipe 150 and are briefly noted herein.

A second or outer pipe 164 surrounds the inner pipe 150 and defines a space 166 for the circulation of purge fluid P therebetween. Heater elements 84, similar to those described with respect to FIG. 1 are included in the space 166 between the pipes 150 and 164. A concentric shell member 100 is disposed about the outer pipe 164 to define a space 102 through which a heat exchange fluid Ex such as water may be circulated. An outer shell 180 similar to the shell 80 in FIG. 1 is provided to surround or encapsulate the entire system 116. Insulative structure 178 between shell member 100 and outer shell 180 prevents heat loss from the system. An inlet pipe 168 for purge fluid P communicates with the space 166 between the respective inner and outer pipes 150 and 164 and an outlet pipe 170 communicates at an opposite end thereof to provide an outlet for the purge fluid P. Inlet 104 for heat exchange fluid Ex communicates with the space 102 between outer pipe 164 and shell member 100. Likewise outlet pipe 106 communicating with space 102 carries heat exchange fluid Ex away.

The purge fluid P protects the heater elements 84 and opposed surfaces of the metal forming the respective inner and outer pipes 150 and 164 within space 166. The heat exchange fluid Ex cools the system indirectly by heat exchange via an intermediate space (e.g. space 166). The fluid P used for purging may be circulated as in FIG. 3 by pump 92 and upstream makeup valve 94. A heat exchanger 90 similar to the arrangement shown in FIG. 4 may be provided to reclaim heat from heat exchanger fluid Ex. The heat obtained by passing fluid F in heat exchange with the system 116 could be blown off as waste heat in a single pass manner or conserved. If practical the latter would be preferable. The indirect system illustrated in FIG. 2 would thus preferably be provided with at least one heat exchanger for cooling the heat exchange fluid Ex and possibly one for claiming available energy from the purge fluid P. Variations of this system may be provided by incorporating the cooling of the purge fluid P and the heat exchange fluid Ex in a combined heat exchanger.

In the system of FIG. 2, smaller quantities of purge fluid P are required because it protects the oxidizable pipe members 150 and 164 while the surrounding heat exchange fluid Ex provides the substantial cooling for conditioning the molten thermoplastic material 9 passing through the pipe 150. In the direct system of FIG. 1 a larger quantity of fluid F is required, since it must both protect the oxidizable components and remove heat. One advantage of the system described in FIG. 2 is that the quantity of heat exchange fluid Ex may be substantially reduced by the use of water. Whichever system is chosen, by virtue of the economic and engineering constraints, each is contemplated to be within the scope of the present invention and either one may become the preferred embodiment of the present invention.

In both of the embodiments of FIG. 1 and FIG. 2 insulative structures 78 and 178 prevent heat loss other than as provided by the controlled passage of cooling fluids through the system. Thus the present invention provides for the retention of heat within the confines of the delivery system and the removal thereof only under conditions as provided for in the controlled cooling of thermoplastic material passing therethrough. The heat retention provided by insulative structures 78 and 178 help to homogenize the material 9 to a more uniform temperature and viscosity.

Temperature control in the present invention is versatile since the flow rate of cooling fluid may be varied to a greater or lesser degree depending on the rate of heat transfer desired. Further the type of cooling fluid may be changed from one liquid to another and will have a significant effect on the heat transfer parameters (e.g. liquid or gas). Heat may be added by heaters adjacent the inner pipe although this is not generally preferred.

The present system is relatively small in dimension but can handle large heat transfer rates. For example in FIG. 2 the inner pipe 50 would be about 2" I.D. With such a small diameter pipe, heat transfer would be rapid and thermal inertia relatively small in comparison to conventional devices. Mixing means referred to above would further enhance heat transfer.

Temperature control of the various cooling and purge fluids and the glass can be controlled to a better precision by appropriate feedback of temperature information especially if the system reacts relatively quickly due to reduced thermal inertia.

The present invention may thus provide for a very high heat transfer rate without the addition of additional energy to cool glass. If desired, it can be a net producer of energy, and thus, the invention would provide a more economical use of energy resources available. The system, by utilizing a molybdenum delivery pipe as described herein, would have an extremely long life as experience has taught in the use of such materials in other delivery systems. Functionally the system may be operated so that it provides for uniform composition and temperature homogeneity of the material in a relatively small unit and with improved control.

In a series of related U.S. patent applications Ser. Nos. 243,811; 244,001; 244,002 filed this same date and assigned to the assignee herein, various arrangements of glass melting and transport systems are disclosed in detail. It should be understood that to the extent necessary, the teachings of said applications should be considered incorporated herein by reference.

While there have been described what at present are considered to be the preferred embodiments of the present invention, it will be obvious to those skilled in the art that various changes and modifications may be made therein without departing from the invention, and it is intended in the appended claims to cover all such changes and modifications as fall within the true spirit and scope of the invention.

I claim:

1. A furnace delivery apparatus for conditioning molten thermo-plastic material leaving the furnace at a relatively high temperature comprising: a pipe having inlet adapted to receive the material at one end and an outlet for delivering said material at a desired homogeneity therefrom, the pipe becoming heated to near the high temperature by contact with the thermoplastic material; a shell having at least one fluid inlet and an outlet, the shell located concentrically about said pipe and defining a closed annular space thereabout for receiving a heat exchange fluid and a purge fluid therein, the purge fluid being inert relative to the pipe, said shell having inlets and outlets for at least one pass circulation of the heat exchange fluid and the purge fluid in at least a portion of the annular space adjacent the pipe for respectively removing sensible heat from the material passing through said pipe and for driving out deleterious ambient atmosphere from the annular space, and thereby shielding the pipe while near the relatively high heat from the deleterious ambient; and an insulating structure located about said annular space for minimizing heat loss therefrom.

2. A furnace delivery apparatus for molten thermoplastic material comprising: a first pipe having an inlet adapted to receive the material and an outlet for delivery of said material therefrom at a desired homogeneity;
   a second pipe concentrically disposed in spaced relation about the first pipe forming a chamber therebetween;
   insulating means surrounding said second pipe for retaining heat within said chamber;
   means for circulating a first fluid in the chamber in heat exchange relation with the first pipe;
   and means for circulating a second fluid in heat exchange relation with said second pipe, said first fluid circulated in the chamber providing a shield for protecting enclosed surfaces of said first and second pipes from deleterious ambience and the second fluid for removing heat from said delivery apparatus;
   said means for circulating the first and second fluids being regulatable to govern the temperature of the thermoplastic material to the desired homogeneity as it passes through the first pipe.

3. The delivery apparatus of claim 2 further including mixing means located within said first pipe for homogenizing the thermoplastic material passing therethrough.

4. The delivery apparatus of claim 2 wherein said first pipe is an oxidizable refractory metal.

5. The delivery apparatus of claim 4 wherein said oxidizable refractory metal is molybdenum.

6. The delivery apparatus of claim 2 wherein said heat exchange fluid is an inert gas.

7. The delivery apparatus of claim 2 wherein said heat exchange fluid is a liquid.

8. The delivery apparatus of claim 2 including at least one heater element means located proximately with said first pipe for providing heat input at selected locations thereabout.

9. The delivery apparatus of claim 2 including means in communication with said heat exchange fluid for removing heat imparted thereto by said material in a recuperative fashion.

10. The delivery apparatus of claim 2 wherein said insulating means comprises a refractory structure surrounding said second pipe.

11. The delivery apparatus of claim 2 further including an outer protective shell disposed about said insulating means.

12. The delivery apparatus of claim 11 wherein the inlet and outlet of said inner pipe each extends beyond a corresponding portion of the second pipe and at least one flange portion is supportively coupled to each of the inlet and outlet, each extends radially outward thereof in communication with said outer protective shell for sealingly closing a corresponding ends of said shell.

13. The delivery apparatus of claim 12 wherein flange cooling means is located in communication with at least a radial circumferential extremity of said flange portion for the inlet for cooling same and thermo-plastic material located in the vicinity thereof.

14. The delivery apparatus of claim 11 wherein the inlet end of said inner pipe extends beyond a corresponding portion of the second pipe and includes at least one flange portion extending radially outward thereof in communication with the outer protective shell.

15. The furnace delivery apparatus of claim 2 wherein the furnace has a delivery tube in axial communication with the first pipe, a support flange for at least each of the respective first pipe and the delivery tube, each support flange being attached to and radially extending from the respective first pipe and delivery tube in opposed axial spaced relation, such that, a gap is formed therebetween, said gap receiving therein molten thermoplastic material, and circumferential cooling means located at circumferential extremities of each said support flanges for providing sufficient cooling to freeze at least a portion of thermo-plastic material located adjacent said cooling means to sealably close said gap.

16. A method of delivering molten thermoplastic material, leaving a furnace at a relatively high temperature through a channel member having an insulating layer spaced exteriorly of the channel member leaving an annular space thereabout, comprising the steps of: conducting said thermoplastic material through the channel member, which channel member becomes heated to near the high temperature by the thermoplastic material in contact therewith; shielding said channel member, while at the elevated temperature, from deleterious ambient atmosphere by supplying a purge fluid into the annular space to be in contact with an exterior of the channel member, and thereby blocking ambient atmosphere from coming into contact with the channel member while it is near the high temperature; choosing the purge fluid to be inert relative to the channel member; and removing heat from said thermo-plastic material by heat exchange with the channel member to a working fluid into and out of portions of said annular space, whereby the thermo-plastic material entering the channel member passes therethrough and is delivered from an outlet end thereof in a desired condition.

17. The method of claim 16 further including the step of mixing the thermo-plastic material within said channel member.

* * * * *